(12) United States Patent
Devlin et al.

(10) Patent No.: US 6,505,877 B1
(45) Date of Patent: Jan. 14, 2003

(54) PORTABLE TWO-PIECE MOTORCYCLE WINDSHIELD

(76) Inventors: John Peter Devlin, 2916 Twin Oaks St., Claremont, NC (US) 28610; James Douglas Mitchell, 4489 Homestead Dr., Morganton, NC (US) 28655

( * ) Notice: Subject to any disclaimer, the term of this patent is extended or adjusted under 35 U.S.C. 154(b) by 0 days.

(21) Appl. No.: 10/047,778

(22) Filed: Jan. 15, 2002

(51) Int. Cl.$^7$ ................................................ B62J 17/00
(52) U.S. Cl. ..................................... 296/78.1; 296/208
(58) Field of Search ............................... 296/78.1, 208, 296/192, 194, 180.1, 77.1, 84.1, 97.8, 91, 86, 97.7

(56) References Cited

U.S. PATENT DOCUMENTS

| | | | |
|---|---|---|---|
| 975,414 A | * 11/1910 | Hadka | 296/89 |
| 1,387,349 A | * 8/1921 | Campbell | 296/78.1 |
| 2,237,594 A | * 4/1941 | Dunlap | 296/78.1 |
| 2,411,131 A | * 11/1946 | Hanson | 296/78.1 |
| 2,564,800 A | * 8/1951 | Bates | 296/78.1 |
| 2,675,266 A | * 4/1954 | Comiskey | 296/78.1 |
| 2,903,297 A | * 9/1959 | Zbikowski | 296/78.1 |
| 3,801,152 A | * 4/1974 | Tims et al. | 296/78.1 |
| 4,022,487 A | * 5/1977 | Leahy | 296/78.1 |
| 4,066,291 A | * 1/1978 | Hickman | 296/78.1 |
| 4,269,445 A | * 5/1981 | Gager, Jr. | 296/78.1 |
| 4,353,590 A | * 10/1982 | Wei-Chuan | 296/78.1 |
| 4,379,584 A | * 4/1983 | Willey | 296/78.1 |
| 4,489,973 A | * 12/1984 | Willey | 296/78.1 |
| 4,606,571 A | * 8/1986 | Fujita | 296/78.1 |
| 4,773,695 A | * 9/1988 | Jones et al. | 296/77.1 |
| 4,790,555 A | * 12/1988 | Nobile | 296/78.1 |
| 5,490,573 A | * 2/1996 | Hagiwara et al. | 296/208 |
| 5,658,035 A | * 8/1997 | Armstrong | 296/78.1 |
| 5,704,679 A | * 1/1998 | Sodo | 296/78.1 |
| 5,732,965 A | * 3/1998 | Willey | 296/78.1 |
| 5,845,955 A | * 12/1998 | Willey | 296/78.1 |
| 5,857,727 A | * 1/1999 | Vetter | 296/78.1 |
| 5,997,070 A | * 12/1999 | Masuo et al. | 296/78.1 |
| 6,254,166 B1 | 7/2001 | Willey | |
| 6,293,606 B1 | * 4/2002 | Jarosz et al. | 296/78.1 |
| 2002/0041107 A1 | * 9/2001 | Takemura et al. | 296/78.1 |

FOREIGN PATENT DOCUMENTS

| | | | |
|---|---|---|---|
| DE | 26 29 731 A1 | * | 1/1978 |
| GB | 2 241 477 A | * | 2/1990 |
| GB | 2 263 259 A | * | 1/1992 |
| WO | WO 97/42070 | * | 5/1996 |
| WO | WO 98/19904 | * | 11/1997 |

* cited by examiner

*Primary Examiner*—Kiran Patel
(74) *Attorney, Agent, or Firm*—Adams, Schwartz & Evans, P.A.

(57) ABSTRACT

A portable two-piece motorcycle windshield assembly includes an upper windshield panel having a lower edge and a lower windshield panel having an upper edge with a shape complementary to the shape of the upper windshield panel defining the lower edge. Connector rods are provided for releasably connecting the upper windshield panel and the lower windshield panel together. The lower edge of the upper windshield and the upper edge of the lower windshield mate together in edge-to-edge aligned registration with each other to collectively form a two-piece windshield. A pair of connector brackets are carried adjacent a bottom edge of the lower windshield panel for releasably attaching the assembled windshield to handlebars of a motorcycle.

14 Claims, 7 Drawing Sheets

PORTABLE TWO-PIECE MOTORCYCLE WINDSHIELD

TECHNICAL FIELD AND BACKGROUND OF THE INVENTION

This invention relates to a portable two-piece motorcycle windshield particularly designed to be compact enough in its disassembled state to fit into a pouch which can be carried in a saddlebag or placed in a luggage or other container carried on the motorcycle. Many motorcycle riders prefer not to ride with a windshield, particularly during the day and during good weather. During bad weather a windshield is very desirable as a safety device to promote visibility and to prevent discomfort or even injury which can result from rain or sleet impacting the face of the rider at high speed. In many areas of the country, particularly at night, insects are a serious problem and may appear without warning. Even small insects can cause pain or injury if hitting the face of the rider at high speed. Rider's goggles can protect the eyes, of course, but the face and neck are left unprotected.

There is therefor a need for a windshield which is compact, completely removable from the handlebars of the motorcycle, which is portable enough to be stored on the motorcycle, which can be quickly assembled and placed on the handlebars when desired and just as easily removed and stored on the motorcycle when its use is no longer necessary or desired.

SUMMARY OF THE INVENTION

Therefore, it is an object of the invention to provide a windshield for use on a motorcycle.

It is another object of the invention to provide a windshield which is portable enough to be stored and carried on the motorcycle when not in use.

It is another object of the invention to provide a windshield which can be quickly and easily assembled and disassembled when necessary without any or minimal tools.

These and other objects of the present invention are achieved in the preferred embodiments disclosed below by providing a portable two-piece motorcycle windshield assembly, comprising an upper windshield panel having a lower edge and a lower windshield panel having an upper edge with a shape complementary to the shape of the upper windshield panel defining the lower edge. Connecting means are provided for releasably connecting the upper windshield panel and the lower windshield panel together. The lower edge of the upper windshield and the upper edge of the lower windshield mate together in edge-to-edge aligned registration with each other to collectively form a two-piece windshield. A pair of connector brackets are carried adjacent a bottom edge of the lower windshield panel for releasably attaching the assembled windshield to handlebars of a motorcycle.

According to one preferred embodiment of the invention, the connecting means comprises a pair of upper connector rods releasably attachable to the upper windshield panel, and a pair of lower connector rods releasably attachable to the lower windshield panel. Attachment members are provided for releasably connecting the upper and lower pairs of connector rods together end-to-end.

According to another preferred embodiment of the invention, the connector means comprises an upper pair of connector rods releasably attachable to the upper windshield panel, each of the pair of connector rods having a lower end adjacent the lower edge thereof, each of the upper pair of connector rods having a through bore therein. A lower pair of connector rods is releasably attachable to the lower windshield panel, each of the lower pair of connector rods having an upper end adjacent the upper edge thereof with a threaded bore therein. A pair of threaded bolts is extended through respective ones the bores in the upper pair of connector rods and threaded into the threaded bores of the upper ends of the lower pair of connector rods for releasably connecting the upper and lower pairs of connector rods together end-to-end.

According to yet another preferred embodiment of the invention, each of the pair of lower connector rods has a threaded bore in a lower end thereof, and each of the pair of connector brackets includes a bore therethrough for permitting each of the brackets to be attached by a threaded bolt extended through the bore in the bracket and threaded into the threaded bore of the lower end of the pair of connector rods.

According to yet another preferred embodiment of the invention, the upper and lower windshield panels are curved along a vertical axis to define an aerodynamic, forwardly-facing convexity when mounted on a motorcycle.

According to yet another preferred embodiment of the invention, the upper and lower windshield panels are each polycarbonate.

According to yet another preferred embodiment of the invention, the connector rods are releasably attached to the upper and lower windshield panels by fasteners extended through bores in the upper and lower windshield panels and attached to the connector rods. The fasteners preferably comprise screws.

According to yet another preferred embodiment of the invention, the connector means comprise a pair of handlebar clamps, each of the handlebar clamps including upper and lower clamp segments having a semiannular recess therein for fitting onto respective upper and lower sides of a motorcycle handlebar.

According to yet another preferred embodiment of the invention, a portable two-piece motorcycle windshield assembly comprises an upper convex windshield panel having a lower edge, a lower convex windshield panel having an upper edge with a shape complementary to the shape of the upper windshield panel defining the lower edge, first and second laterally spaced-apart connectors secured to a surface of the upper and lower windshield panels for releasably connecting the upper windshield panel and the lower windshield panel together wherein the lower edge of the upper windshield and the upper edge of the lower windshield mate together in edge-to-edge aligned registration with each other to collectively form a two-piece windshield, and a pair of connector brackets carried adjacent a bottom edge of the lower windshield panel for releasably attaching the assembled windshield to handlebars of a motorcycle.

According to yet another preferred embodiment of the invention, the connectors comprise elongate members secured to a concave, rearwardly-facing surface of the windshield panels.

According to yet another preferred embodiment of the invention, the elongate members comprise annular rods having a flat surface for residing flush against the windshield panels.

According to yet another preferred embodiment of the invention, the windshield assembly includes a carry pouch having first and second pockets for receiving the upper and lower windshield panels.

According to yet another preferred embodiment of the invention, the carry pouch comprises a motorcycle saddle bag for being attached to a side of a rear wheel of a motorcycle.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
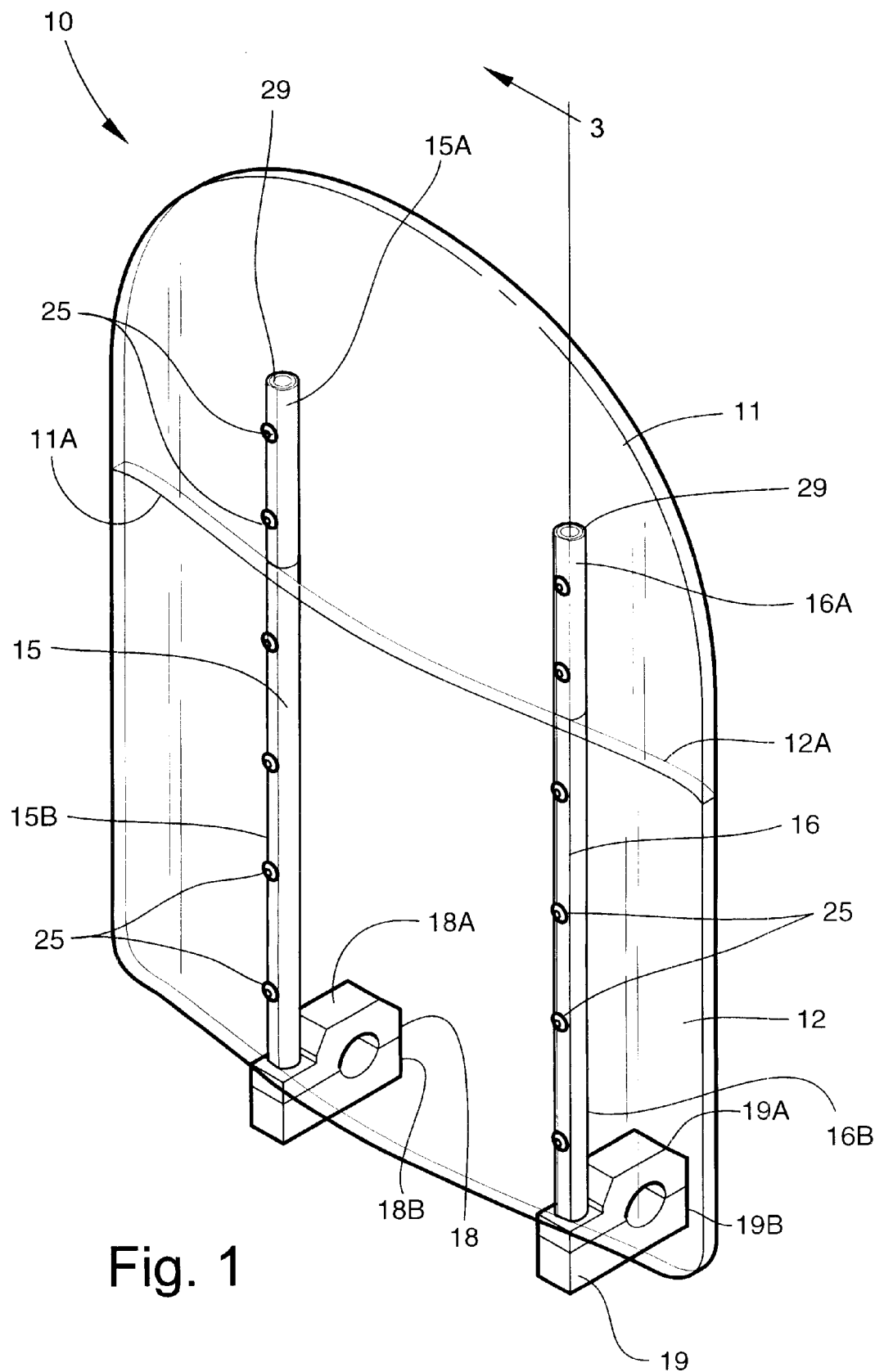
FIG. 1 is a perspective view of a windshield according to one preferred embodiment of the invention.

Referring now specifically to the drawings, a portable windshield assembly according to the present invention is illustrated in FIG. 1 and shown generally at reference numeral 10. The windshield 10 is formed of an upper windshield panel 11, a lower windshield panel 12, a pair of windshield panel connector means 15 and 16, and a pair of handlebar connector clamps 18 and 19. The upper and lower windshield panels 11 and 12 are fabricated of a tough, shatterproof or resistant transparent material, preferably polycarbonate. Laminated glass and plexiglass are also suitable for use. A suitable thickness is ¼ inch (6 mm).

The windshield panels 11 and 12 are preferably formed with a vertically oriented convexity which is positioned facing forwardly in the direction of travel. This provides an aerodynamically efficient shape which reduces drag and also tends to disperse rain and other material impacting the windshield 10 to the sides and off of the windshield surface.

Figure 2:
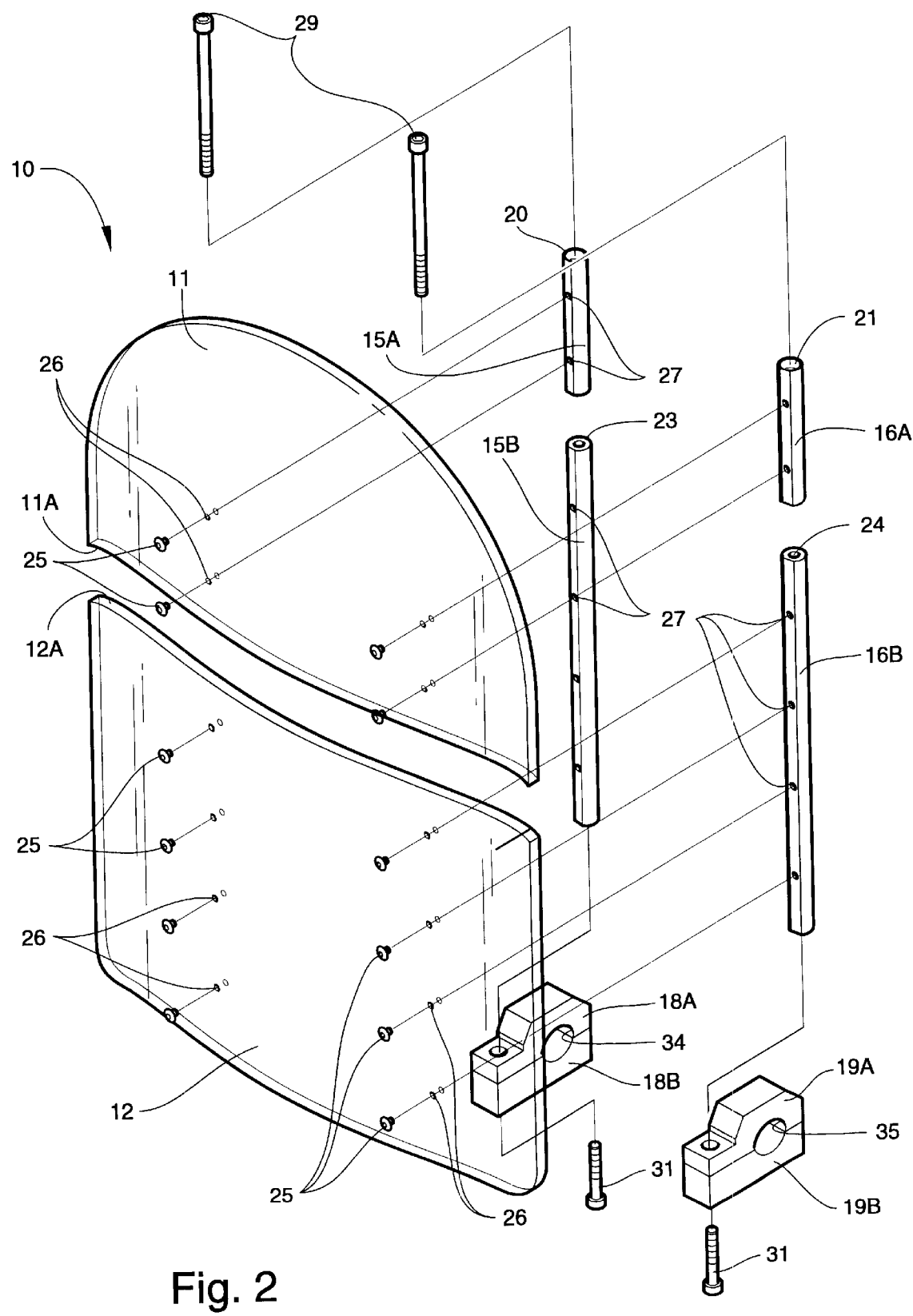
FIG. 2 is an exploded perspective view of the windshield shown in FIG. 1.
Figure 3:
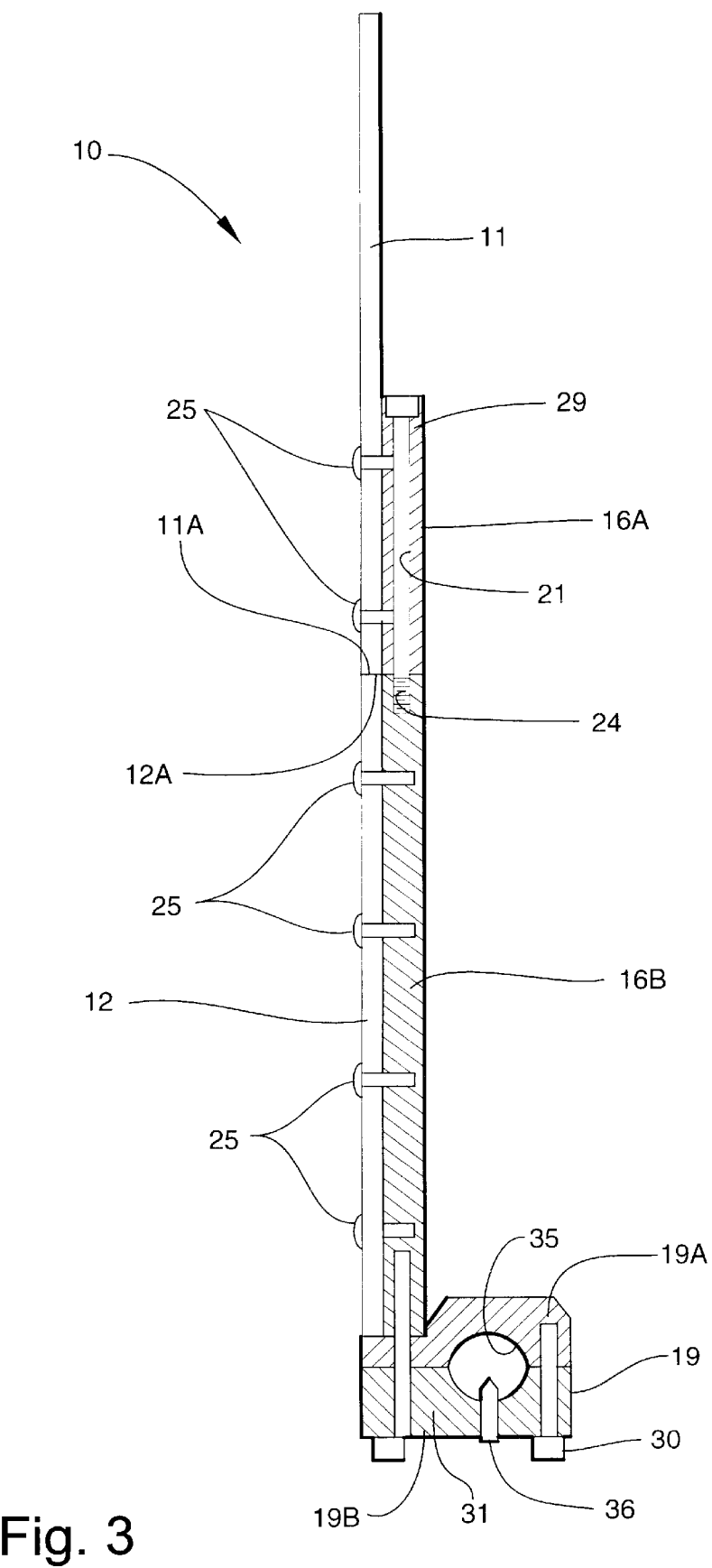
FIG. 3 is a side elevation of the windshield shown in FIG. 1.

Referring now also to FIGS. 2 and 3, the upper windshield panel 11 has a lower edge 11A which mates with an identically-shaped upper edge 12A of the lower windshield panel 12 to provide an essentially seamless assembled windshield 10. The upper and lower windshield panels 11 and 12 are connected together by means of the connector means 15 and 16, which are comprised of a pair of upper connector rods 15A, 16A and a pair of lower connector rods 15B, 16B. As is best shown in FIGS. 2 and 3, the upper connector rods 15A, 16A are provided with through bores 20 and 21, respectively, and the upper end of the lower connector rods 15B, 16B have threaded bores 23, 24, respectively.

The upper and lower connector rods 15A, 15B, 16A, 16B are attached to the rear surface of the upper and lower windshield panels 11 and 12 by means of button socket cap screws 25 which extend through holes 26 formed in the upper and lower windshield panels 11 and 12 and are threaded into threaded bores 27 in the forward side of the connector rods 15A, 15B, 16A, 16B. The forward side of each of the connector rods 15A, 15B, 16A, 16B is preferably flat so as to fit flush against the surface of the windshield 10. See FIG. 2.

Bolts 29 with threaded ends extend through the bores 20 and 21 in upper connector rods 15A, 16A and are threaded into the bores 23 and 24 in the top end of the lower connector rods 15B, 16B. As the bolts 29 are tightened the upper and lower windshield panels 11 and 12 are drawn together to form a rigid, unitary structure. Bolts 29 preferably have socket heads which extend into the bores 20 and 21 when fully tightened.

Figure 4:
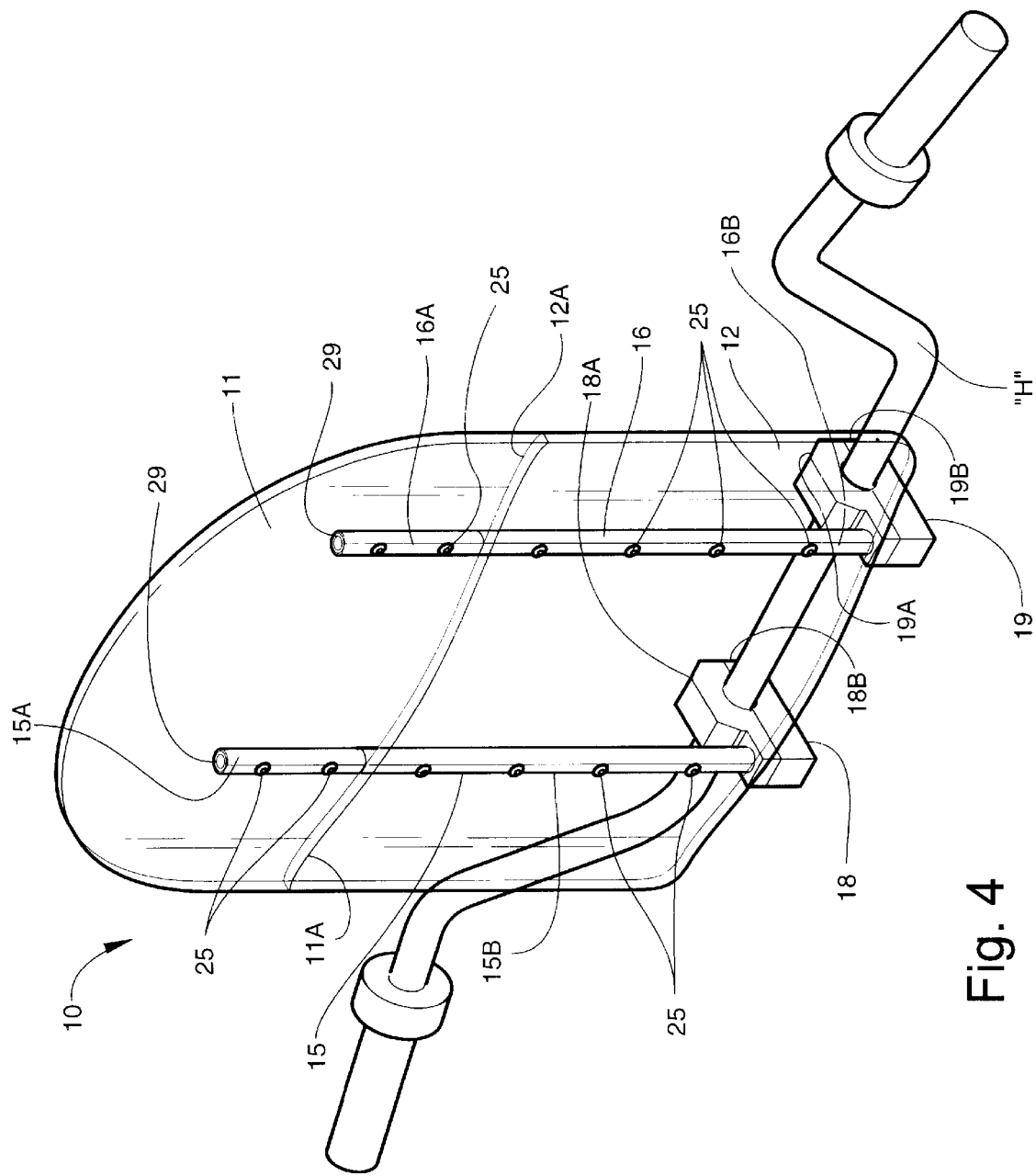
FIG. 4 is a perspective view of the windshield in place on a set of motorcycle handlebars.

The handlebar connector clamps 18 and 19 are formed of upper and lower clamp segments 18A, 18B, 19A, 19B, respectively. Two pairs of bolts 30, 31 secure the upper and lower clamp segments 18A, 18B, 19A, 19B together, as shown in FIG. 3. Semiannular recesses in the adjacent faces of the upper and lower clamp segments 18A, 18B, 19A, 19B collectively define annular openings 34, 35, respectively, to receive a handlebar "H" as shown in FIG. 4. Setscrews 36 as shown in FIG. 3 are provided and are preferably screwed into holes formed in the bottom of the handlebar "H" for this purpose, and provides a positive lock against rotation of the windshield 10 on the handlebar "H."

Alternatively, the connector clamp 18 and 19 can be modified to provide a hinge in place of the bolt 30 so that the clamp hinges open for placing on and removing the windshield 10 from the handlebar "H" not shown. Also not shown is a plastic liner sheet which can be placed in the recesses of the 18A, 18B, 19A, 19B to prevent scratching and other damage to the surface of the handle bar "H."

Figure 5:
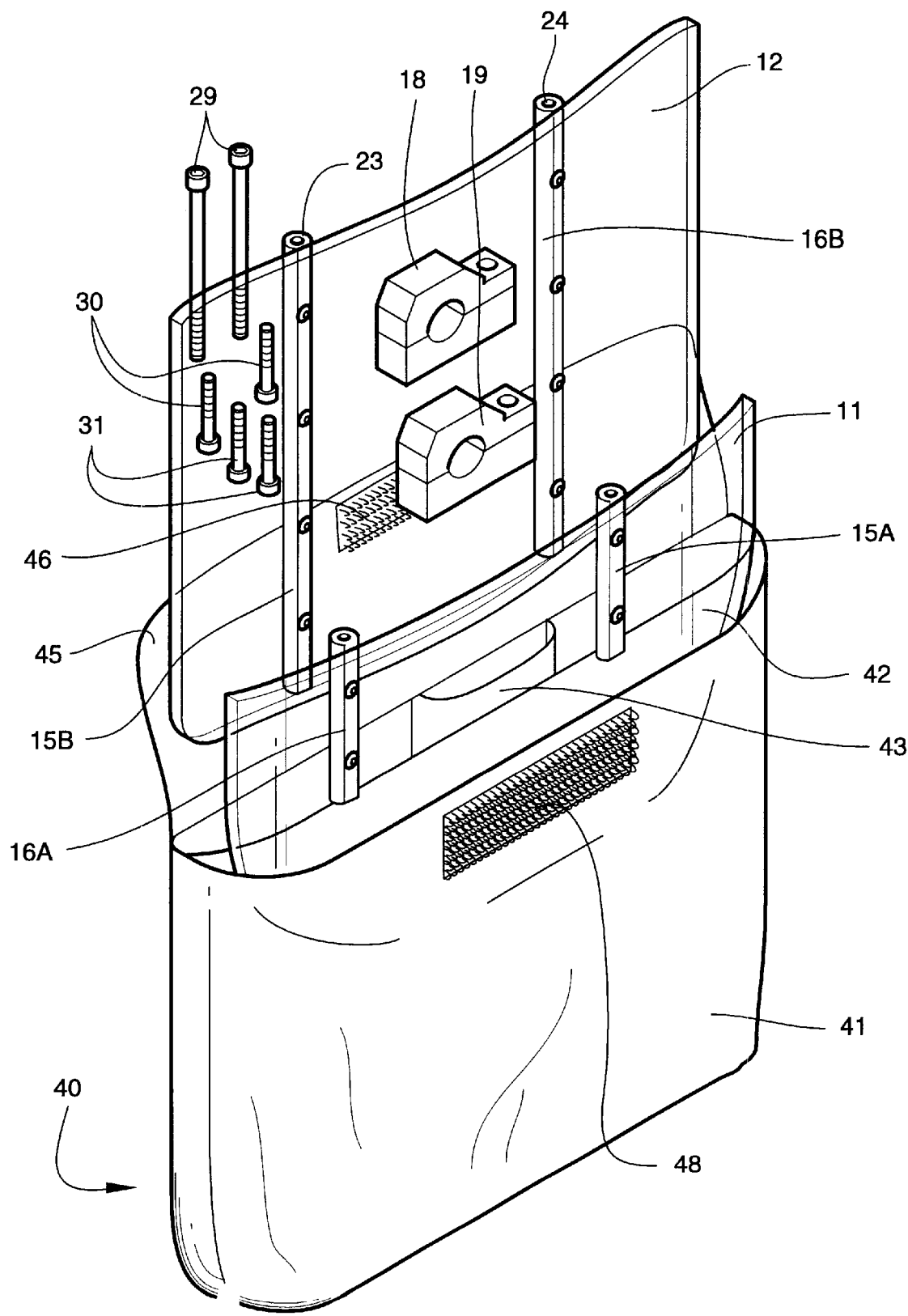
FIG. 5 is a perspective view of the disassembled windshield showing placement in a pouch suitable for being carried on the motorcycle when not in use.

Referring now to FIG. 5, a pouch 40 is provided which permits the windshield 10 in its disassembled form to be compactly stored and carried on the motorcycle when not in use. The pouch 40 includes an outer body 41, a divider panel 42 and an inner pouch 43. As shown, the upper panel 11 and the lower panel 12 fit into the pouch on opposite sides of the divider panel 42, and the handlebar connector clamps 18, 19 and bolts 29, 31 and 32 fit within the inner pouch 43. Pouch 40 also includes a closure flap 45 with a patch of hook material 46 secured to the inner surface that mates with a patch of loop material 48 secured to the front of the pouch body 41 to hold the pouch in a closed position.

The dimensions of the windshield 10, can, of course, vary depending on the size of the motorcycle and rider preference. One preferred embodiment of the windshield 10 for a Harley-Davidson motorcycle includes an upper windshield panel 11 which is 12 inches (30 cm) wide and 7.5 inches high (19 cm) long, and a lower windshield panel 12 which is 12 inches (30 cm) wide and 7.5 inches (19 cm) high, resulting in windshield which provides a windshield 10 which is 5 inches (38 cm) high and 12 inches(30 cm) wide. This size is sufficient to provide proper protection to the rider against impact against the head and torso.

Figure 6:
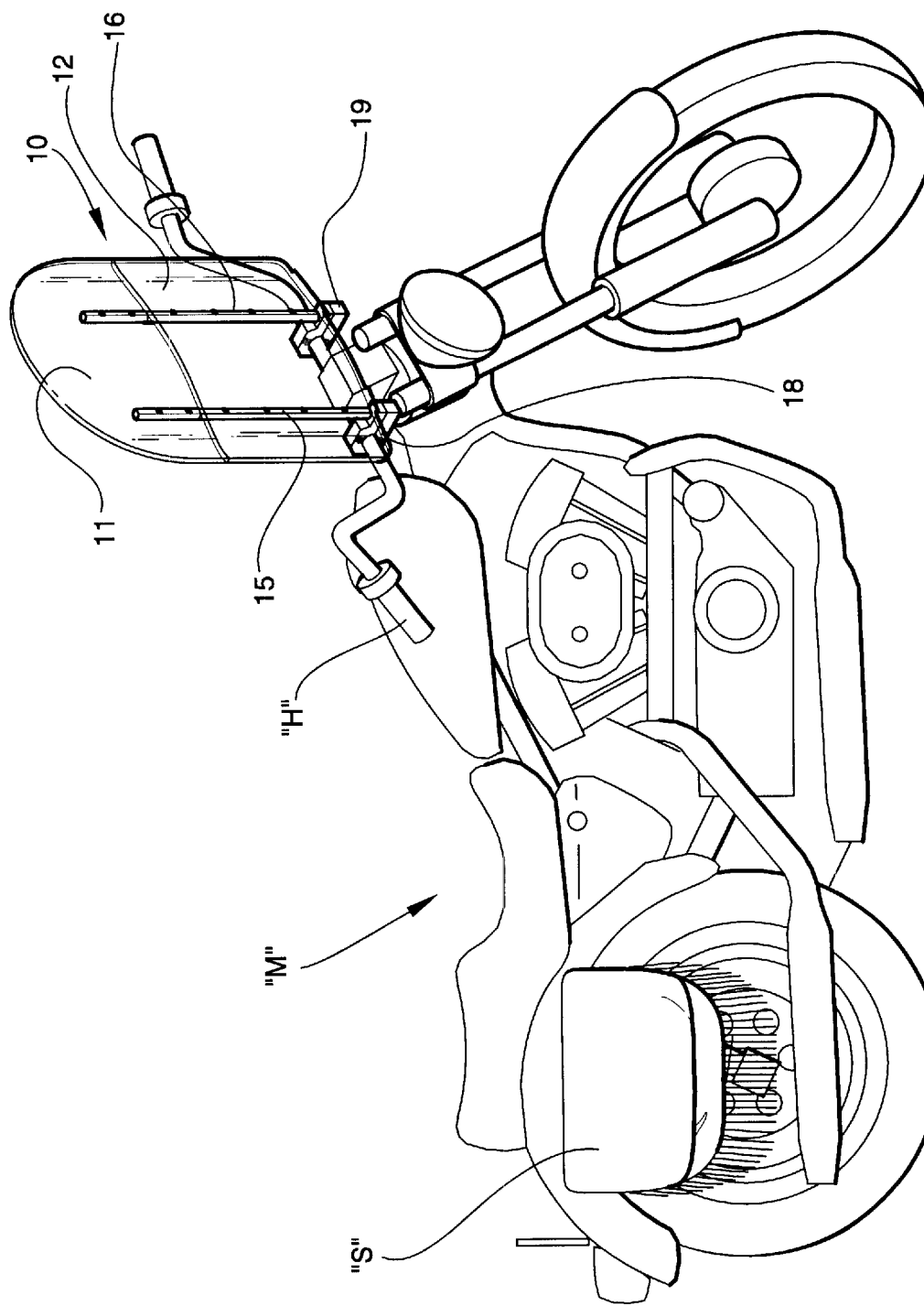
FIG. 6 shows the windshield in place on a motorcycle.
Figure 7:
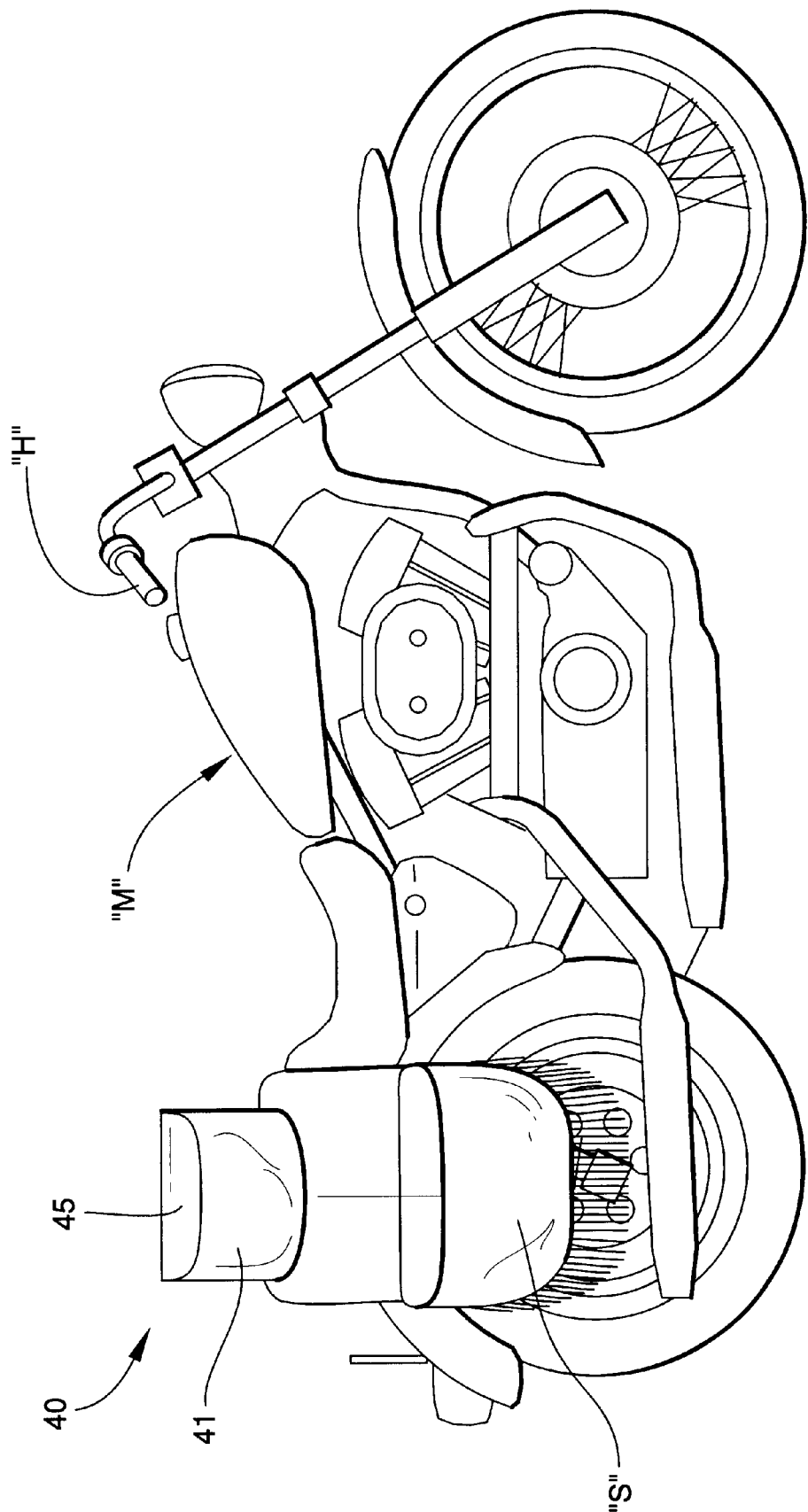
FIG. 7 shows the windshield removed and in a pouch sized to fit within a motorcycle saddlebag.

FIG. 6 illustrates the windshield 10 in place on a motorcycle "M", and FIG. 7 shows the windshield 10 removed, placed in the pouch 40 and being stowed in a saddlebag "S."

A portable, two piece windshield for a motorcycle is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A portable two-piece motorcycle windshield assembly, comprising:
   (a) an upper windshield panel having a lower edge;
   (b) a lower windshield panel having an upper edge with a shape complementary to the shape of the lower edge of the upper windshield panel;
   (c) connecting means for releasably connecting the upper windshield panel and the lower windshield panel together with the lower edge of the upper windshield and the upper edge of the lower windshield mated together in edge-to-edge aligned registration with each other to collectively form a two-piece windshield; and
   (d) a pair of connector brackets carried by the connector means adjacent a bottom edge of the lower windshield panel for releasably attaching the assembled windshield to handlebars of a motorcycle.

2. A two-piece motorcycle windshield according to claim 1, wherein the connecting means comprises:
   (a) a pair of upper connector rods releasably attachable to the upper windshield panel;
   (b) a pair of lower connector rods releasably attachable to the lower windshield panel; and
   (c) attachment members for releasably connecting the upper and lower pairs of connector rods together end-to-end.

3. A two-piece motorcycle windshield according to claim 1, wherein the connector means comprises:
   (a) an upper pair of connector rods releasably attachable to the upper windshield panel, each of the pair of connector rods having a lower end adjacent the lower edge thereof, each of the upper pair of connector rods having a through bore therein;
   (b) a lower pair of connector rods releasably attachable to the lower windshield panel, each of the lower pair of connector rods having an upper end adjacent the upper edge thereof with a threaded bore therein; and
   (c) a pair of threaded bolts for being extended through respective ones of the bores in the upper pair of connector rods and being threaded into the threaded bores of the upper ends of the lower pair of connector rods for releasably connecting the upper and lower pairs of connector rods together end-to-end.

4. A two-piece motorcycle windshield according to claim 3 wherein each of the pair of lower connector rods has a threaded bore in a lower end thereof, and each of the pair of connector brackets includes a bore therethrough for permitting the each of the brackets to be attached by a threaded bolt extended through the bore in the bracket and threaded into the threaded bore of the lower end of the pair of connector rods.

5. A two-piece motorcycle windshield according to claim 1, 2, 3 or 4 wherein the upper and lower windshield panels are curved along a vertical axis to define an aerodynamic, forwardly-facing convexity when mounted on a motorcycle.

6. A two-piece motorcycle windshield according to claim 5, wherein the upper and lower windshield panels are each polycarbonate.

7. A two-piece motorcycle windshield according to claim 2, 3, or 4, wherein said connector rods are releasably attached to the upper and lower windshield panels by fasteners extended through bores in the upper and lower windshield panels and attached to the connector rods.

8. A two-piece motorcycle windshield according to claim 7, wherein said fasteners comprise screws.

9. A two-piece motorcycle windshield according to claim 2, 3 or 4, wherein said connector brackets comprise a pair of handlebar clamps, each of said handlebar clamps including upper and lower clamp segments having a semiannular recess therein for fitting onto respective upper and lower sides of a motorcycle handlebar.

10. A portable two-piece motorcycle windshield assembly, comprising:
    (a) an upper convex windshield panel having a lower edge;
    (b) a lower convex windshield panel having an upper edge with a shape complementary to the shape of the upper windshield panel defining the lower edge;
    (c) first and second laterally spaced-apart connectors secured to a surface of the upper and lower windshield panels for releasably connecting the upper windshield panel and the lower windshield panel together wherein the lower edge of the upper windshield and the upper edge of the lower windshield mate together in edge-to-edge aligned registration with each other to collectively form a two-piece windshield; and
    (d) a pair of connector brackets carried adjacent a bottom edge of the lower windshield panel for releasably attaching the assembled windshield to handlebars of a motorcycle.

11. A two-piece motorcycle windshield according to claim 10, wherein the connectors comprise elongate members secured to a concave, rearwardly-facing surface of the windshield panels.

12. A two-piece motorcycle windshield according to claim 11, wherein said elongate members comprise annular rods having a flat surface for residing flush against the windshield panels.

13. A two-piece motorcycle windshield according to claim 10, and including a carry pouch having first and second pockets for receiving the upper and lower windshield panels.

14. A two-piece motorcycle windshield according to claim 13, wherein said carry pouch comprises a motorcycle saddle bag for being attached to a side of a rear wheel of a motorcycle.

* * * * *